（12）United States Patent
Youn et al.

(10) Patent No.: US 8,699,524 B2
(45) Date of Patent: Apr. 15, 2014

(54) METHOD AND APPARATUS FOR GENERATING RESIZE CONTROL OVERHEAD IN OPTICAL TRANSPORT NETWORK

(75) Inventors: Ji-Wook Youn, Daejeon-si (KR); Jong-Yoon Shin, Daejeon-si (KR); Jong-Ho Kim, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 42 days.

(21) Appl. No.: 13/463,304

(22) Filed: May 3, 2012

(65) Prior Publication Data

US 2012/0281983 A1 Nov. 8, 2012

(30) Foreign Application Priority Data

May 4, 2011 (KR) .................. 10-2011-0042695
Apr. 26, 2012 (KR) .................. 10-2012-0044096

(51) Int. Cl.
*H04J 3/24* (2006.01)
*H04B 10/20* (2011.01)

(52) U.S. Cl.
USPC ............................................. 370/474; 398/58

(58) Field of Classification Search
None
See application file for complete search history.

(56) References Cited

U.S. PATENT DOCUMENTS 7,742,502 B2    6/2010  Vissers et al.
2012/0170936 A1*  7/2012  Vissers et al. .................. 398/58

* cited by examiner

*Primary Examiner* — Clemence Han
(74) *Attorney, Agent, or Firm* — Nelson Mullins Riley & Scarborough LLP; Anthony A. Laurentano, Esq.; Lewis Lee, Esq.

(57) ABSTRACT

There is provided a source node apparatus including: a Bandwidth Resize (BWR) generator configured to insert an InRP signal and an InTSCC signal into OPUflex Resize Control Overhead (RCOH) and to transmit the resultant OPUflex RCOH; and a BWR relay generator configured to insert an Resizing Protocol indicator (RP) signal and a Tributary Slot Connectivity Check (TSCC) signal into higher order OPUk RCOH with reference to the InRP signal and the InTSCC signal included in the OPUflex RCOH transmitted by the BWR generator, and transmit the resultant higher order OPUk RCOH.

7 Claims, 5 Drawing Sheets

FIG. 2

| Column Row | 15 |
|---|---|
| 1 | RCOH1 |
| 2 | RCOH2 |
| 3 | RCOH3 |
| 4 | PSI |

OPUflex OH

| | 1 | 2 | 3 | 4 | 5 | 6 | 7 | 8 |
|---|---|---|---|---|---|---|---|---|
| 1 | BWR_IND | RES | InRP | }50 RESERVED | | | | |
| 2 | BWR_IND | NCS | InTSCC | RESERVED | | | | |
| 3 | CRC-3 | | | RESERVED | | | | |

OPUflex RCOH

| Column Row | 15 |
|---|---|
| 1 | RCOH1 |
| 2 | RCOH2 |
| 3 | RCOH3 |
| 4 | PSI |

HO OPUk OH

| | 1 | 2 | 3 | 4 | 5 | 6 | 7 | 8 |
|---|---|---|---|---|---|---|---|---|
| 1 | RP | RES | RES | TPID | | | | |
| 2 | TSCC | RES | RES | TSGS | CTRL | | TPID | |
| 3 | CRC-3 | | | CRC-5 | | | | |

HO OPUk RCOH

# METHOD AND APPARATUS FOR GENERATING RESIZE CONTROL OVERHEAD IN OPTICAL TRANSPORT NETWORK

CROSS-REFERENCE TO RELATED APPLICATION

This application claims the benefit under 35 U.S.C. §119 (a) of Korean Patent Applications No. 10-2011-0042695, filed on May 4, 2011, and No. 10-2012-0044096, filed on Apr. 26, 2012, the entire disclosures of which are incorporated herein by reference for all purposes.

BACKGROUND

1. Field

The following description relates to a method of dynamically transmitting packet client signals through an optical transport network, and more particularly, to an apparatus and method for generating overhead in an optical transport network.

2. Description of the Related Art

An optical transport network defines transport signals called OPUk (Optical channel Payload Unit, k=0, 1, 2, 2e, 3, 4, flex), ODUk (Optical channel Data Unit, k=0, 1, 2, 2e, 3, 4, flex), and OTUk (Optical channel Transport Unit, k=1, 2, 3, 4).

Specifically, the optical transport network further defines an ODUflex (flexible ODU) signal in order to flexibly and effectively receive client signals, particularly, packet signals while enhancing transmission efficiency. The ODUflex signal is obtained by encapsulating a packet signal using Generic Framing Procedure (GFP), GFP-mapping the encapsulated packet signal to an ODUflex payload, and then adding ODUflex overhead to the resultant signal.

Meanwhile, the ODUflex signal can be multiplexed to High Order ODUk (HO ODU, k=2, 3, 4) through Generic Mapping Procedure (GMP).

SUMMARY

The following description relates to an apparatus and method for generating Resize Control Overhead (hereinafter, simply referred to as RCOH) defined in Recommendation ITU-T G.7044.

The following description also relates to an apparatus and method for transmitting a Resizing Protocol indicator (RP) signal and a Tributary Slot Connectivity Check (TSCC) signal between a Bandwidth Resize (BWR) source/sync unit and a BWR relay source/sync unit by inserting the RP and TSCC signals into OPUflex RCOH, instead of using a separate control signal, in the case where the BWR source/sync unit is physically separated from the BWR relay source/sync unit.

In one general aspect, there is provided a source node apparatus including: a Bandwidth Resize (BWR) generator configured to insert an InRP signal and an InTSCC signal into OPUflex Resize Control Overhead (RCOH) and to transmit the resultant OPUflex RCOH; and a BWR relay generator configured to insert an Resizing Protocol indicator (RP) signal and a Tributary Slot Connectivity Check (TSCC) signal into higher order OPUk RCOH with reference to the InRP signal and the InTSCC signal included in the OPUflex RCOH transmitted by the BWR generator, and transmit the resultant higher order OPUk RCOH.

In another general aspect, there is provided a method of generating Resize Control Overhead (RCOH) in a source node, the method including: at a Bandwidth Resize (BWR) generator, generating an InRP signal and an InTSCC signal; at the BWR generator, inserting the InRP signal and the InTSCC signal into OPUflex RCOH; at a BWR relay generator, generating an RP signal and a TSCC signal using the InRP signal and the InTSCC signal inserted into the OPUflex RCOH; and at the BWR relay generator, inserting the RP signal and the TSCC signal into HO OPUk RCOH.

Other features and aspects will be apparent from the following detailed description, the drawings, and the claims.

BRIEF DESCRIPTION OF THE DRAWINGS

FIG. 2 shows configuration examples of RCOH.

Figure 1:
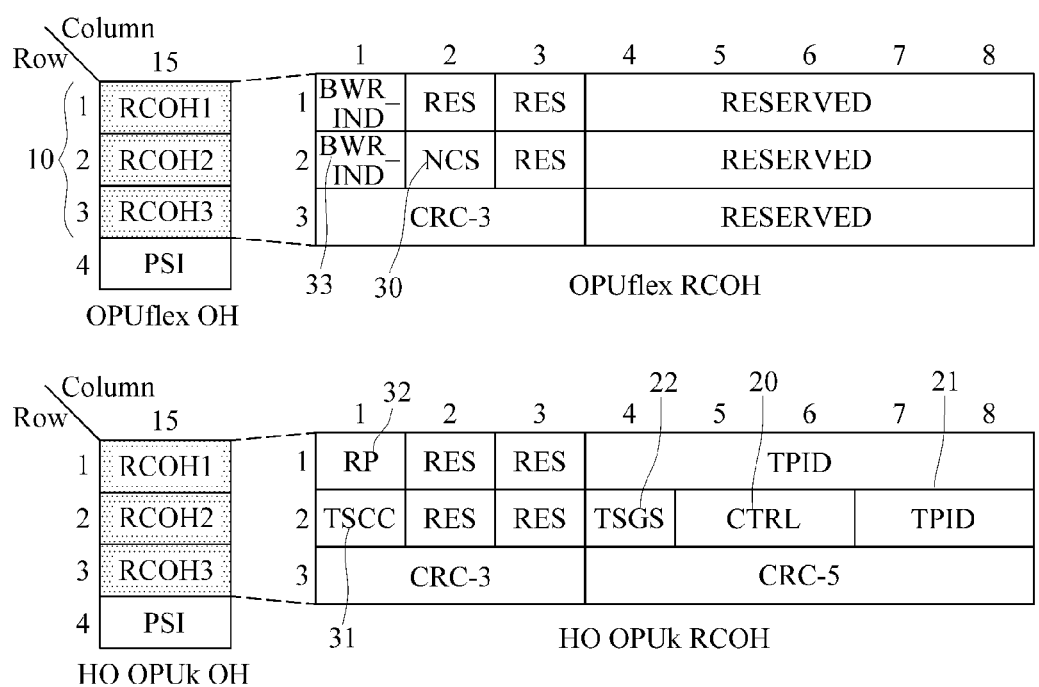
FIG. 1 shows configuration examples of Resize Control Overhead (RCOH) defined in Recommendation ITU-T G.7044.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following description relates to application of Resize Control Overhead (RCOH) defined in Recommendation ITU-T G.7044, and more particularly, to a method of exchanging BWR overhead signals through RCOH between an ODUfP/PCK function block and an ODUkP/ODUj-21 function block in an ODUflex (GFP) source node and a sync node.

FIG. 1 shows configuration examples of RCOH defined in the Recommendation ITU-T G.7044.

FIG. 1 shows RCOH that is used to hitlessly decrease or increase an amount of transmission using ODUflex (GFP), wherein the RCOH uses the first, second, and third rows of the 15-th column of an OPUk frame.

RCOH is greatly classified into Link Connection Resize (LCR) protocol overhead and Bandwidth Resize (BWR) protocol overhead.

Here, the LCR protocol overhead includes a Control (CTRL) signal 20, a Tributary Port ID (TPID) signal 21, and a Tributary Slot Group Status (TSGS) signal 22, and the BWR protocol overhead includes a Network Connectivity Status (NCS) signal 30, a Tributary Slot Connectivity Check (TSCC) signal 31, a Resizing Protocol indicator (RP) signal 32, and a Bandwidth Resize Indicator (BWR_IND) signal 33.

The above-mentioned signals configuring RCOH are defined as follows.

First, the RP signal 32 represents whether 3 bytes corresponding to the first, second, and third rows in the 15-th column of an OPUk frame are allocated to RCOH for an ODUflex (GFP) hitless resizing protocol. That is, if the RP value is "0", this means that the 3 bytes have been allocated to OPUk overhead, and if the RP value is "1", this means that the 3 bytes have been allocated to RCOH. The TSCC signal 31 is a signal bit for checking connectivity of the link connection and ODUflex(GFP) connection. The NCS signal 30 is used to represent a network connection status. The BWR_IND signal 33 is used to indicate that the ODUflex(GFP) source is adjusting the ODUflex(GFP) signal's bit rate.

The TPID signal 21 represents the port IDs of tributary slots. The TSGS signal 22 represents the status of the corresponding tributary slot group. The CTRL signal 20, which is a control signal, has a value of "01" in the case of adding a tributary slot and a value of "10" in the case of removing a tributary slot. Also, the CTRL signal 20 has a value of "11" in a normal status and a value of "00" in an idle status.

Referring to FIG. 1, NCS signal 30 and BWR_IND signal 33 among the RCOH signals are inserted into OPUflux RCOH, and the remaining signals are inserted into HO OPUk RCHO and transmitted.

In the case of using the conventional RCOH described above, when a switching function is performed between the ODUfP/PCK function block and the ODUkP/ODUj-21 function block in the ODUflex (GFP) source node and sync node, the RP and TSCC signals cannot be transmitted using a Characteristic Information (CI) signal since the ODUfP/PCK function block is physically separated from the ODUkP/ODUj-21 function block.

In other words, in the conventional method, in order to transmit/receive the RP and TSCC signals using a CI signal between a BWR source/sync function block and a BWR relay source/sync function block in the case where the BWR source/sync function block is physically separated from the BWR relay source/sync function block, a separate signal other than OPUflex RCOH has to be defined. The reason is because the OPUflex RCOH has no function of supporting the RP and TSCC signals.

Accordingly, in order to overcome the problem, the RES areas of the OPUflex RCOH are used to transmit the RP and TSCC signals when the RP and TSCC signals are transmitted/received through a CI signal between the BWR source/sync function block and the BWR relay source/sync function block.

FIG. 2 shows configuration examples of RCOH.

Referring to FIG. 2, InRP and InTSCC bit signals 50 are inserted into RES bits of OPUflex RCOH. The example of FIG. 2 shows the case where InRP and InTSCC bit signals are inserted into the first and second rows of the third column of OPUflex RCOH, however, this is only exemplary. That is, the InRP and InTSCC bit signals may be inserted into any ones of the other RES bits. Also, the abbreviations "InRP" and "InTSCC" are named only for convenience of description, not for limitation of functions. By inserting the InRP and InTSCC signals into the OPUflex RCOH, RP and TSCC signals are inserted into HO OPUk RCOH.

Figure 3:
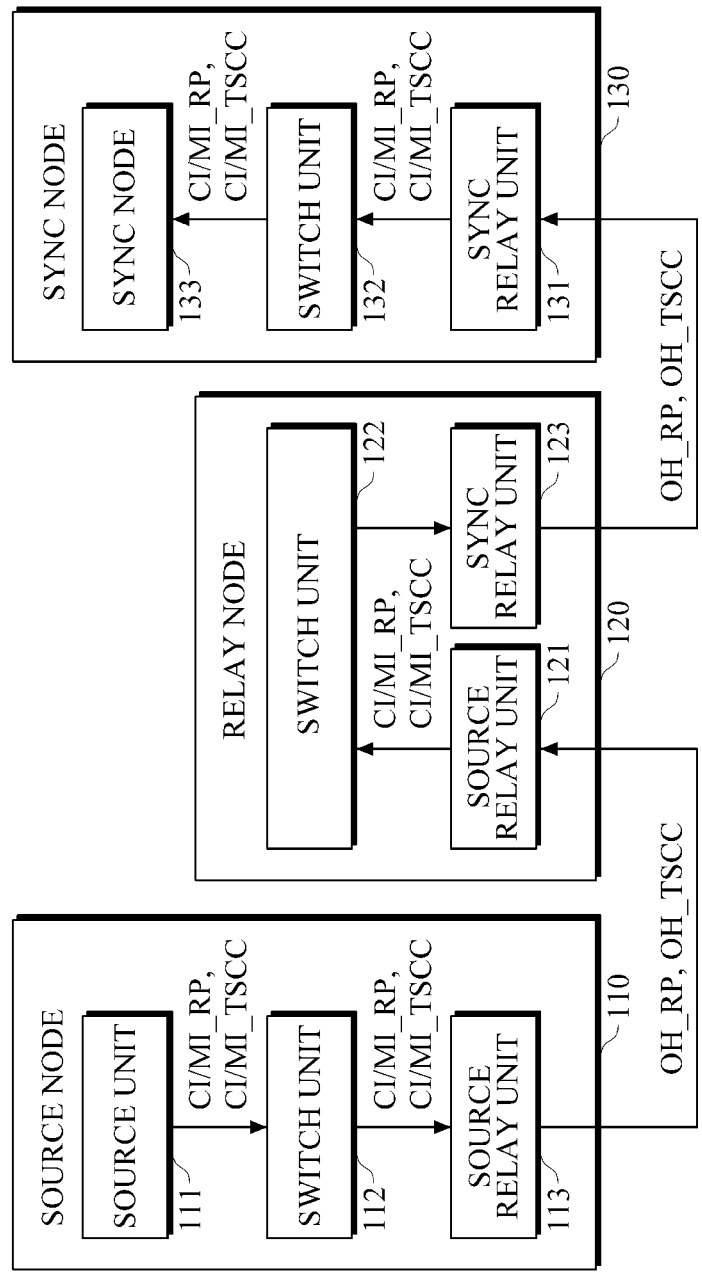
FIG. 3 is a diagram illustrating an example of an optical transport network.

FIG. 3 is a diagram illustrating an example of an optical transport network.

Referring to FIG. 3, a data transport system that transmits data through the optical transport network includes an ODUflex (GFP) source node (hereinafter, referred to as a source node) 110, an ODUflex (GFP) relay node (hereinafter, referred to as a relay node) 120, and an ODUflex (GFP) sync node (hereinafter, referred to as a sync node) 130. The source node 110 receives data that is to be transmitted from a client terminal, and converts the received data into a data format that can be transmitted through the optical transport network. The relay node 120 transmits data received from the source node 110 to a sync node 130 located in a destination to which the data has to be transmitted. The sync node 130 transmits the data received from the relay node 120 to a destination client terminal. In an actual system, a node, which is named as an End node, is configured with a source node and a sync node bi-directionally.

The source node 110 includes a source unit 111, a switch unit 112, and a source relay unit 113. Since the source node 110 includes the switch unit 112, if the conventional RCOH as shown in FIG. 1 is used, no RP and TSCC signals can be transmitted through RCOH between the source unit 111 and the source relay unit 113. Accordingly, the RP and TSCC signals have to be transmitted through a separate signal.

Accordingly, the source unit 111 generates an InRP signal and an InTSCC signal, inserts them into OPUflex RCOH, and transmits the resultant OPUflex RCOH to the source relay unit 113 through the switch unit 112.

The source relay unit 113 generates an RP signal and a TSCC signal using the InRP and InTSCC signals received from the source unit 111, inserts the RP and TSCC signals into HO OPUk RCOH, and then transmits the resultant HO OPUk RCOH to the sync node 130 through the relay node 120.

The source relay unit 113 may maintain, after generating the RP and TSCC signals, the InRP and InTSCC signals as they are, or delete the InRP and InTSCC signals from the OPUflex RCOH.

The relay node 120 transmits the RP and TSCC signals received from the source node 110 to the sync node 130. The relay node 120 includes a switch unit 122, a source relay unit 121, and a sync relay unit 123.

The switch unit 122 switches ODUflex signals received by the source relay unit 121 according to overhead information of the ODUflex signals. The source relay unit 121 receives signals transmitted by the source node 110 and transfers the received signals to the switch unit 122. The sync relay unit 123 transfers the signals switched by the switch unit 122 to a sync node 130 that covers a region to which a destination terminal belongs.

The sync node 130 includes a sync relay unit 131, a switch unit 132, and a sync unit 133.

The sync relay unit 131 processes RP and TSCC signals included in received HO OPUk RCOH and then transfers, if there are InRP and InTSCC signals in the OPUflex RCOH, the InRP and InTSCC signals are transferred to the sync unit 133 through the switch unit 132.

The sync unit 133 processes the InRP and InTSCC signals received through the OPUflex RCOH from the sync relay unit 131.

Figure 4:
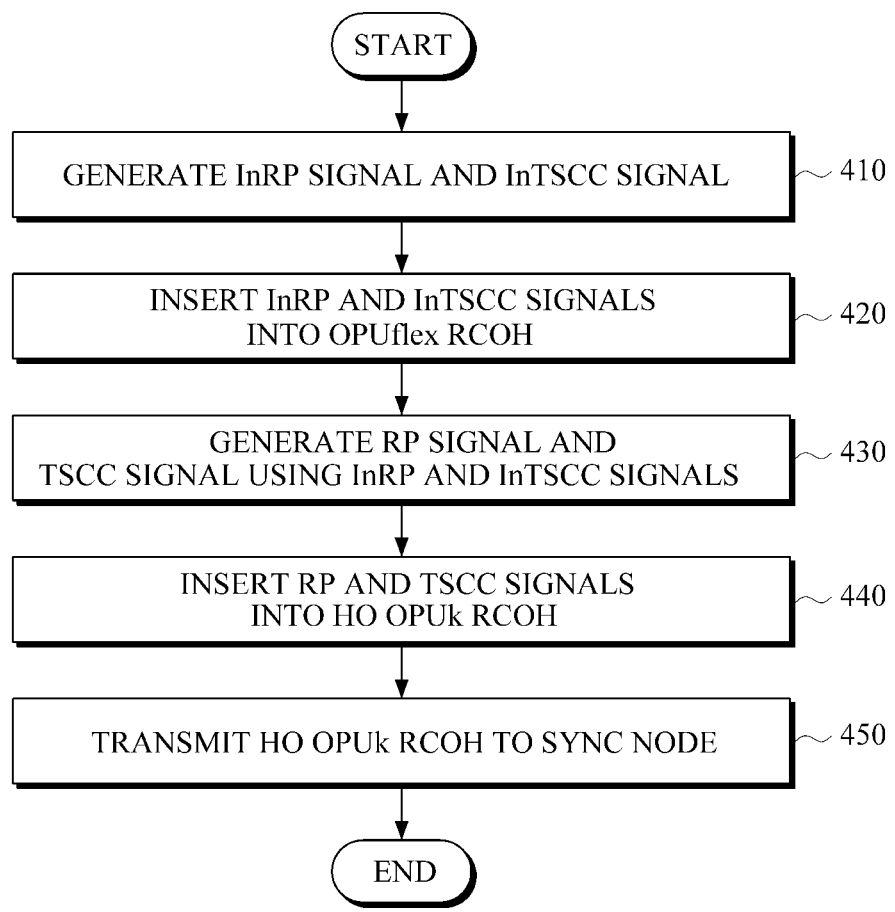
FIG. 4 is a flowchart illustrating an example of a method of generating RCOH in a source node.

FIG. 4 is a flowchart illustrating an example of a method of generating RCOH in an optical transport network.

Referring to FIGS. 3 and 4, the source unit 111 of the source node 110 generates an InRP signal and an InTSCC signal (410). Then, the source unit 111 inserts the InRP and InTSCC signals into the RES areas of OPUflex RCOH (420).

Then, the source unit 111 transfers the resultant OPUflex RCOH to the source relay unit 113.

The source relay unit 113 generates an RP signal and a TSCC signal using the InRP and InTSCC signals received from the source unit 111 (430). Then, the source relay unit 113 inserts the RP and TSCC signals into HO OPUk RCOH (440). The source relay unit 113 may maintain, after generating the RP and TSCC signals, the InRP and InTCSS signals as they are in the OPUflex RCOH, or delete the InRP and TSCC signals from the OPUflex RCOH. Then, the source relay unit 113 transmits the HO OPUk RCOH to the sync node 130 through the relay node 120 (450).

Figure 5:
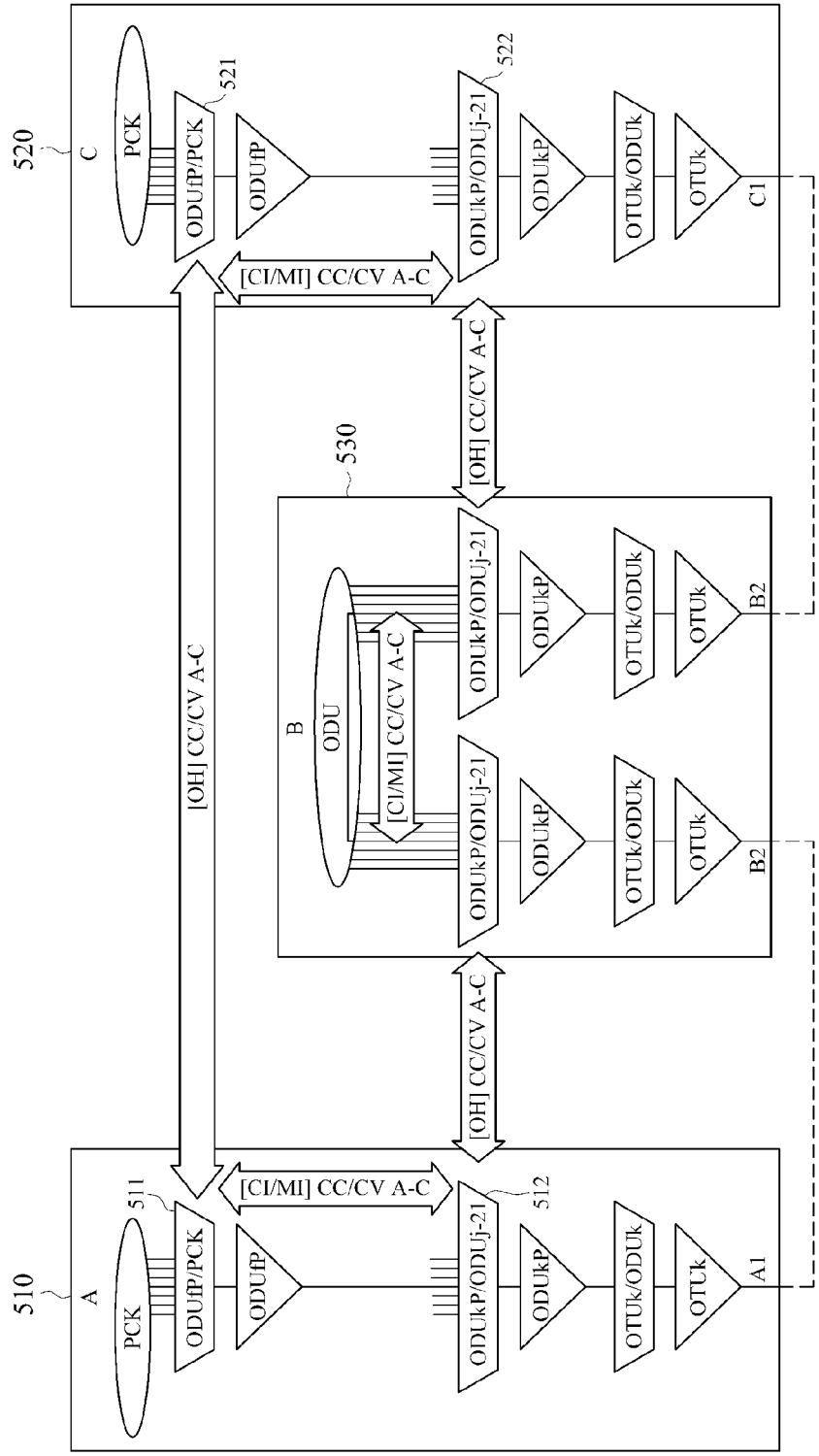
FIG. 5 is a view for explaining a Bandwidth Resize (BWR) protocol defined in Recommendation ITU-T G.7044.

FIG. 5 illustrates an example of an optical transport network.

Referring to FIG. 5, the optical transport network includes data transmission/reception apparatuses 510 and 520 and a relay apparatus 530.

The functions of the source unit 111 illustrated in FIG. 3 are performed by a OPUfP/PCK_A_So function block 511, and the functions of the sync unit 133 are performed by an ODUfP/PCK_A_Sk function block 521.

Also, the functions of the source relay unit 113 illustrated in FIG. 3 are performed by the ODUkP/ODUj-21_A_So function block 512, and the functions of the sync relay unit 131 may be performed by the OUkP/ODUj-21_A_Sk function block 522. That is, the source unit 111 is logically and physically separated from the source relay unit 113.

Accordingly, means for communication between the source unit 111 and the relay unit 113 is needed, and a Characteristic Information (CI)/Management Information (MI) signal is used for signal transmission/reception between the source unit 111 and the relay unit 113. According to the conventional method, in order for the source unit 111 to receive/transmit RP and TSCC signals from/to the relay unit 113 using a CI signal, a separate signal other than OPUflex RCOH has to be defined. The reason is because the conventional method has no function of supporting RP and TSCC signals through OPUflex RCOH. Accordingly, in the current example, in order to overcome the problem, when RP and TSCC signals are transmitted between the source unit 111 and the relay unit 113 using a CI signal, the RP and TSCC signals are contained in the RES parts of OPUflex RCOH and transmitted.

Therefore, as described above, since RP and TSCC signals are transmitted using the reserved (RES) areas of OPUflex RCOH between a BWR source/sync unit and a BWR relay source/sync unit, it is unnecessary to define a separate signal for RP and TSCC signals.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A source node apparatus comprising:
    a Bandwidth Resize (BWR) generator configured to insert an Inserted Resizing Protocol indicator (InRP) signal and an Inserted Tributary Slot Connectivity Check (InTSCC) signal into flexible Optical channel Payload Unit (OPUflex) Resize Control Overhead (RCOH) and to transmit the resultant OPUflex RCOH; and
    a BWR relay generator configured to insert an Resizing Protocol indicator (RP) signal and a Tributary Slot Connectivity Check (TSCC) signal into Higher Order (HO) Optical channel Payload Unit (OPUk) RCOH with reference to the InRP signal and the InTSCC signal included in the OPUflex RCOH transmitted by the BWR generator, and transmit the resultant HO OPUk RCOH.

2. The source node apparatus of claim 1, wherein the RP signal and the TSCC signal are transmitted between the BWR generator and the BWR relay generator using a Characteristic Information (CI) signal.

3. The source node apparatus of claim 1, wherein the TSCC signal is a signal for checking link connectivity and flexible Optical channel Data Unit (ODUflex) connectivity, wherein ODUflex signal is encapsulated using Generic Framing Procedure (GFP).

4. The source node apparatus of claim 1, wherein the RP signal is a value indicating which one of RCOH or OPUk overhead is allocated 3 bytes corresponding to first, second and third rows of a 15-th column of an OPUk frame.

5. A method of generating Resize Control Overhead (RCOH) in a source node, the method comprising:
    at a BandWidth Resize (BWR) generator, generating an Inserted Resizing Protocol indicator (InRP) signal and an Inserted Tributary Slot Connectivity Check (InTSCC) signal;
    at the BWR generator, inserting the InRP signal and the InTSCC signal into flexible Optical channel Payload Unit (OPUflex) RCOH;
    at a BWR relay generator, generating an Resizing Protocol indicator (RP) signal and a Tributary Slot Connectivity Check (TSCC) signal using the InRP signal and the InTSCC signal inserted into the OPUflex RCOH; and
    at the BWR relay generator, inserting the RP signal and the TSCC signal into Higher Order (HO) Optical channel Payload Unit (OPUk) RCOH.

6. The method of claim 5, wherein the generating of the RP signal and the TSCC signal comprises, at the BWR relay generator, maintaining, after generating the RP signal and the TSCC signal, the InRP signal and the InTSCC signal in the OPUflex RCOH, or deleting the InRP signal and the InTSCC signal from the OPUflex RCOH.

7. The method of claim 5, further comprising, at the BWR generator, transmitting the OPUflex RCOH to the BWR relay generator through a switch unit.

* * * * *